(12) United States Patent
Burgman et al.

(10) Patent No.: US 6,290,044 B1
(45) Date of Patent: Sep. 18, 2001

(54) SELECTABLE ONE-WAY CLUTCH ASSEMBLY

(75) Inventors: Boris Iosifovich Burgman, Oak Park; Dwayne Paul Joppeck, Saline; John William Kimes, Wayne, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/541,551

(22) Filed: Apr. 3, 2000

(51) Int. Cl.[7] .............................. F16D 41/12; F16D 11/14; F16D 25/00
(52) U.S. Cl. ................... 192/46; 188/82.3; 188/82.4; 192/69.1; 192/85 R; 192/93 A
(58) Field of Search ............................... 192/46, 47, 69.1, 192/93 A, 219.2, 17 R, 12 B, 85 R; 475/312, 318; 188/72.7, 82.3, 82.4, 82.9

(56) References Cited

U.S. PATENT DOCUMENTS

| 4,466,520 | 8/1984 | Herman | 192/28 |
|---|---|---|---|
| 4,629,044 | 12/1986 | Post et al. | 192/28 |
| 4,771,872 | 9/1988 | Kampf | 192/28 |
| 5,152,726 | * 10/1992 | Lederman | 188/82.3 X |
| 5,927,455 | * 7/1999 | Baker et al. | 192/46 X |
| 5,937,980 | * 8/1999 | Dick | 192/46 X |
| 5,967,277 | * 10/1999 | Walter | 192/46 X |
| 6,032,774 | * 3/2000 | Gadd | 192/46 X |

FOREIGN PATENT DOCUMENTS 5-126170 * 5/1993 (JP) .

* cited by examiner

Primary Examiner—Rodney H. Bonck
(74) Attorney, Agent, or Firm—Laura C. Hargitt

(57) ABSTRACT

A selectable one-way clutch assembly for use in an automatic transmission comprises a strut plate rotatable about a central hub and having pockets and struts mounted therein for pivotable rotation. A selecting plate concentrically located about an activator hub has teeth extending axially inboard and configured to fit in the apertures in an activator plate. A turning device is selectively operable to activate one-way clutching mode by rotating the pin of a control plate to disengage selecting cams and displace selecting plate teeth inboard beyond the inboard face of the activator plate wherein the struts catch the teeth when the strut plate assembly is rotated in a clutching direction. The catching ends of the struts are cammed in the pockets by ramped camming ends of the teeth when the strut plate assembly is rotated in the opposing direction, thereby allowing freewheeling of the strut plate in the overrun direction.

4 Claims, 4 Drawing Sheets

SELECTABLE ONE-WAY CLUTCH ASSEMBLY

TECHNICAL FIELD

The present invention relates to a selectable one-way clutch assembly for an automatic transmission.

BACKGROUND OF THE INVENTION

One-way clutches are commonly employed in automatic transmissions for automobiles. A one-way clutch allows a first clutch plate to free-wheel in a first rotational direction relative to a second clutch plate, and to clutch in a second rotational direction. Examples include roller clutches and sprag clutches.

It may be desirable to have the one-way clutching mode operable only upon demand, such that it is in free-wheeling mode in both directions until the one-way clutching is selectively actuated. There are different means of selecting when the free-wheeling stops and one-way clutching begins.

There exists a need for a simple selectable one-way clutch which allows free-wheeling in both directions when the clutch is not actuated. When the clutch is actuated, the clutch plate may be held fixed from rotating in a first direction, but allowed to rotate in a second, overrun direction.

SUMMARY OF THE INVENTION

The present invention is directed to a selectable one-way clutch assembly for use in an automatic transmission having two axially adjacent, rotatable plates wherein a first, strut plate freewheels in both directions relative to a second, actuator plate in a clutch-inactivated state. When the clutch is selectively actuated, the strut plate is fixed to the actuator plate in the clutching direction, but is rotatable in the second, overrun direction.

The selectable one-way clutch assembly comprises the annular strut plate rotatable about a central hub and having circumferentially spaced pockets and struts mounted therein. The struts have a catching end biased outboard to contact the axially adjacent actuator plate. The actuator plate includes apertures arranged circumferentially thereabouts and extending therethrough. An annular selecting plate, axially adjacent the actuator plate, has circumferentially-spaced teeth extending axially inboard and configured to fit in the apertures in the activator plate. The selecting plate has selecting cams extending axially from an outboard surface to mesh with interior cams on an axially adjacent control plate.

A turning means is selectively operable to activate one-way clutching mode by rotating an outboard-extending pin of the control plate to disengage the selecting cams and displace the selecting plate and the teeth inboard beyond the inboard face of the activator plate. The struts catch the teeth when the strut plate is rotated in a clutching direction, thereby fixing the strut plate to the activator plate. When the strut plate is rotated in the opposing, overrun direction, the catching ends of the struts are cammed in the pockets by ramped camming ends of the teeth, thereby allowing free-wheeling of the strut plate in the overrun direction. When the turning means is deselected to inactivate the one-way clutching mode, a return spring disposed between the activator plate and the selecting plate provides an outboard biasing load on the selecting plate and control plate such that the teeth are fully retracted within the apertures, allowing free-wheeling of the strut plate in either direction relative to the actuator plate.

DESCRIPTION OF THE PREFERRED EMBODIMENT

A selectable one-way clutch assembly of the present invention, shown generally as 10, provides for free-wheeling of a first plate relative to an axially adjacent second plate in both rotational directions until the clutch is selectively activated. Upon clutch actuation, the first plate is held from rotating in the first, clutching direction, relative to the second plate, but permitted to rotate in the second, overrun direction.

Figure 1:
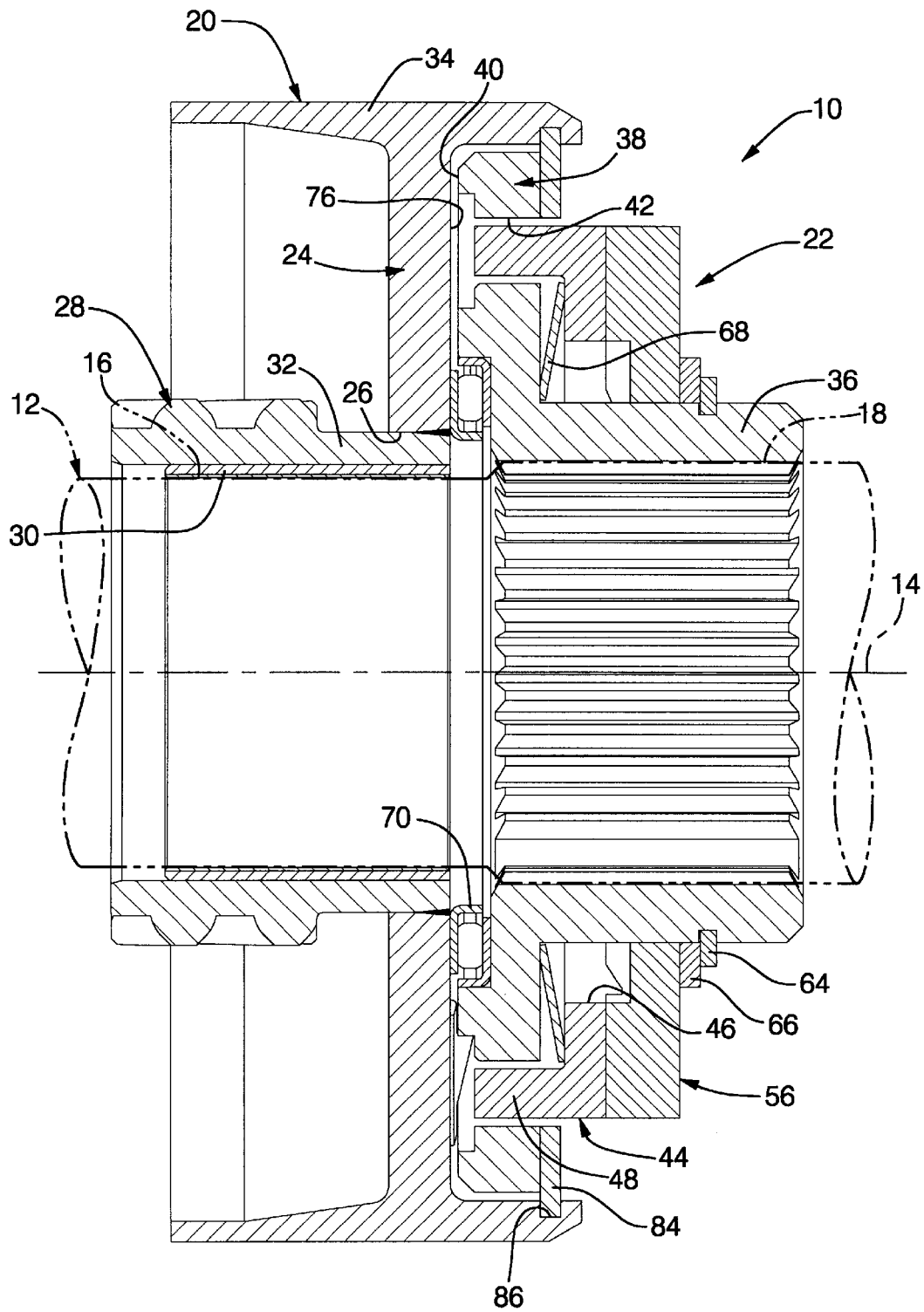
FIG. 1 is a cross section of a selectable one-way clutch assembly of the present invention in a portion of an automatic transmission.

In FIG. 1, the selective one-way clutch assembly 10 is located co-axially about a central hub of an internal drive 12, which is ground to the transmission case, not shown. The central hub 12 defines a central axis 14 and includes a hub journal portion 16 and an externally splined portion 18.

Figure 2:
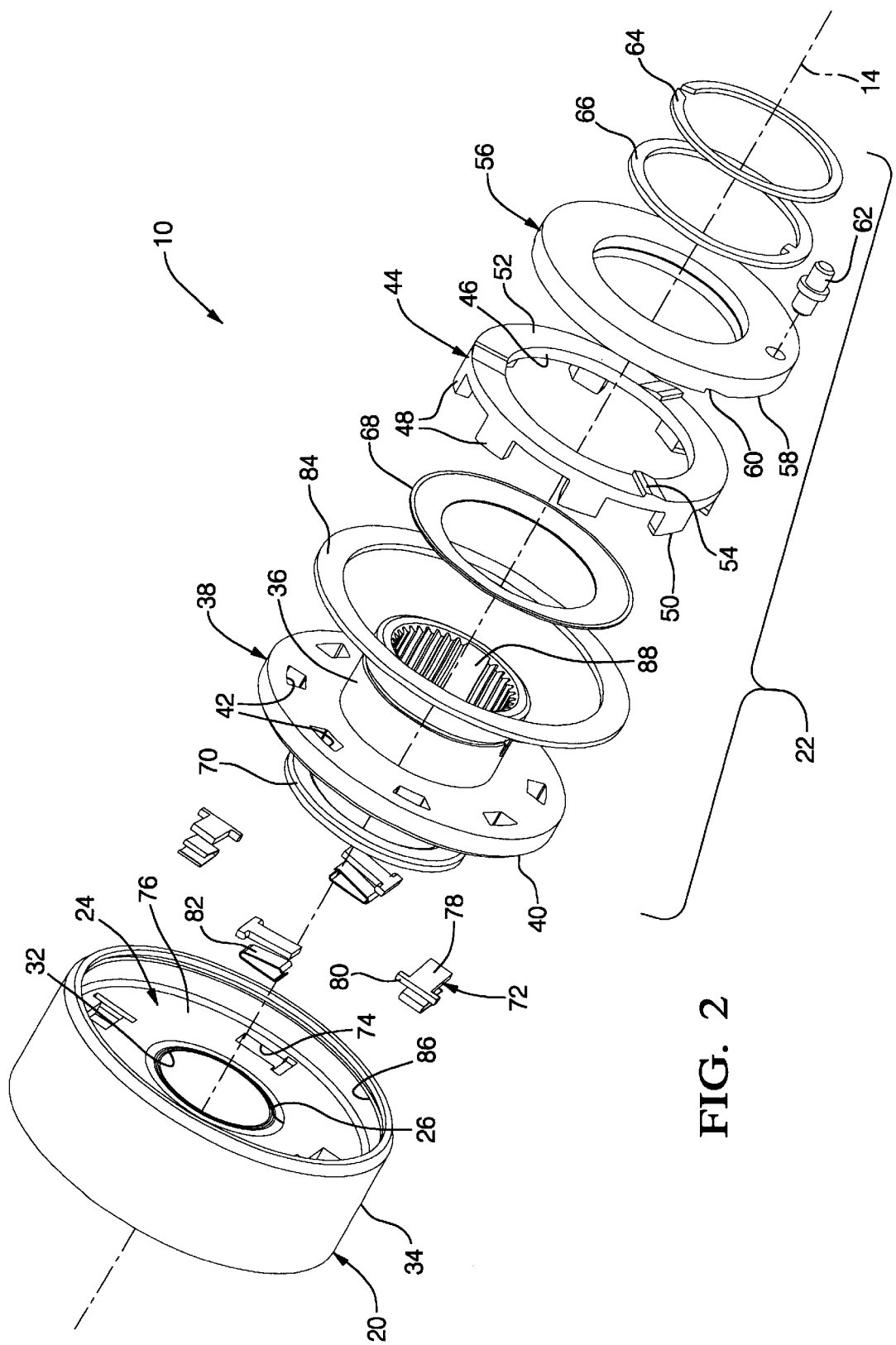
FIG. 2 is an expanded view of the clutch assembly of FIG. 1.

The individual components of the clutch assembly 10 are shown in an expanded view in FIG. 2. The clutch assembly 10 is comprised of two sub-assemblies: a strut plate assembly 20 and an activator plate assembly 22.

With reference to FIGS. 1 and 2, the strut plate assembly 20 includes an annular strut plate 24 having a central bore 26 through which the central hub 12 extends. The strut plate assembly 20 also includes a torque-transmitting piece 28 to transmit torque in either direction from a torque input source, not shown, to the strut plate 24. Here the torque-transmitting piece is shown as a reaction sun gear 28 of a compound planetary gear set, not shown. Other possibilities may include a ring gear or hub with splines, depending upon the automatic transmission application. The sun gear 28 is co-axially rotatable about the hub journal portion 16 of the central hub 12 with a sliding bearing 30 therebetween. The sun gear 28 has a non-splined cylindrical end 32 to which the strut plate 24 is permanently affixed, such as by welding. The strut plate assembly 20 may also include a brake-transmitting portion 34 to transmit a braking force from an independent braking source, not shown, to the strut plate 24. Here the brake-transmitting portion is a cylindrical drum 34, coaxial with the sun gear 28, and formed integrally with the strut plate 24. The strut plate 24 extends radially from the non-splined end 32 of the sun gear 28 to the cylindrical drum 34 at an outboard end of the strut plate assembly 20, where outboard is defined to the right on FIG. 1.

The activator plate assembly 22 is located co-axially with the central hub 12 and outboard of the strut plate assembly 20. The activator plate assembly 22 is comprised of an activator hub 36, internally splined to meshingly engage the externally splined portion 18 of the central hub 12 thereby fixing the activator hub 36. The activator hub 36 is integrally formed with an activator plate 38 extending radially outward from the inboard end of the activator hub. The inboard face 40 of the activator plate 38 is in close axial adjacency to the strut plate 24. Teeth-mating apertures 42 are arranged circumferentially about the activator plate 38 and extend therethrough.

The activator plate assembly 22 also includes an annular, selecting plate 44 having an axial bore 46 to fit concentrically about the activator hub 36. Circumferentially-spaced teeth 48 extend axially inboard towards the strut plate 24. The teeth 48 are sized and spaced to pilot in the teeth-mating apertures 42 in the activator plate 38 and may extend beyond the inboard face 40 of the activator plate during clutch actuation. The ends of the teeth include a ramped, camming surface 50. On the outboard side 52 of the selecting plate 44, selecting cams 54 are arranged circumferentially and extend axially.

Next, the activator plate assembly 22 includes a control plate 56 concentric with the activator hub 36 and axially adjacent to the selecting plate 44. The inboard side 58 of the control plate 56 includes interior cams 60 sized and spaced to receive and mesh with the selecting cams 54 of the selecting plate 44. On the outboard side of the control plate 56, a turning handle in the form of a pin 62 is fixed to the control plate and extends axially outboard therefrom.

To complete the activator plate assembly 22, a snap ring 64 about the activator hub 36 retains the selecting plate 44, control plate 56, and a washer 66 on the hub. A return spring 68 is disposed pre-loaded between the activator plate 38 and the selecting plate 54 to provide an axial, outboard load on the selecting plate 44 and control plate 56 against the washer 66 so the teeth 48 are fully retracted within the teeth-mating apertures 42.

The clutch assembly 10 also includes a thrust bearing 70 held in a counterbore in the inboard face 40 of the activator plate 38 to bear the thrust load between the activator plate assembly 22 and the strut plate assembly 20.

The clutch assembly 10 further includes locking struts 72 seated in pockets 74 arranged circumferentially about the outboard face 76 of the strut plate 24. The struts 72 are comprised of a movable catching end 78 and a shoulder end 80, which is mounted for pivotable rotation within the pocket 74. The catching end 78 of each strut 72 is biased outboard to contact the inboard face 40 of the activator plate 38 by means of a leaf spring 82 within the pocket 74 underneath the catching end. The catching ends 78 contact the activator plate 38 at the same radius at which the teeth-mating apertures 42 are located.

To hold the strut plate and activator plate assemblies 20,22 together, the clutch assembly 10 includes a weir plate 84 installed into an internal groove 86 of the drum 34 of the strut plate assembly 20 adjacent the outboard side of the activator plate 38 to absorb any forces tending to separate the strut and activator plates 24,38 and retain the relative positions of the two assemblies.

For assembling the clutch assembly 10 on the central hub 12, the activator hub 36 may have gaps 88 from missing internal splines, which must be aligned with externally splined portion 18 of the central hub 12 for proper orientation therebetween. The gaps 88 may also provide an oil path for directing oil to the struts 72 through the thrust bearing 70 as adequate lubrication is needed to minimize wear.

Figure 4:
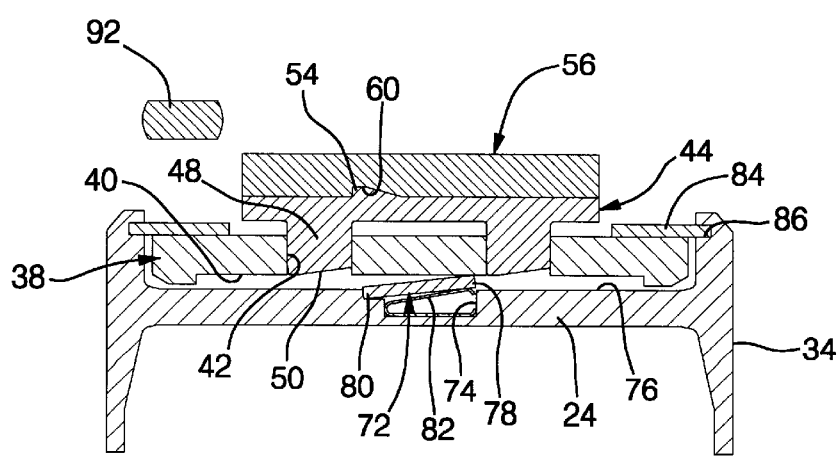

The clutch assembly 10 requires a turning means 90 for turning the fixed pin 62, and thus the control plate 56, relative to the selecting plate 44. As shown in FIG. 4, the turning means 90 includes a hydraulic actuator having an actuating member 92, with a small radial slot 94 through which the pin 62 extends, and a pressurizeable chamber 96. Upon pressurization, the actuating member 92 is displaced along a tangent of the control plate 56, and thus the pin 62 is displaced rotationally. The actuator 90 includes an actuator release spring 98 to bias and return the actuating member 92 towards the chamber 96. The turning means may also include an electrical solenoid to displace an actuating member as described above.

Figure 3:
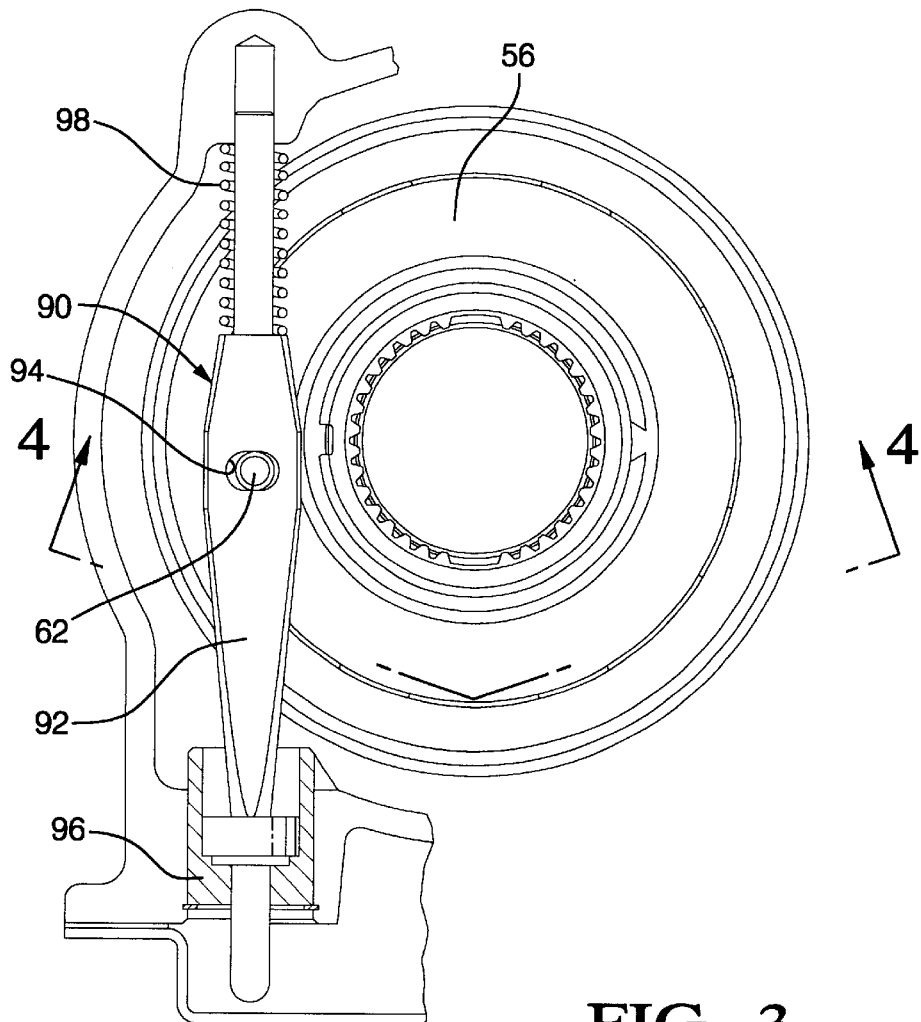
FIGS. 3 and 4 illustrate the clutch assembly in the free-wheeling mode.

In the free-wheeling state of operation shown in FIGS. 3 and 4, the strut plate assembly 20 may free wheel about the central hub 12 in either direction. Here the interior cams 60 of the control plate 56 are meshed with the corresponding selecting cams 54 on the selecting plate 44. The selecting plate 44 and thus its teeth 48 are held axially outboard by the return spring 68. Therefore the teeth are flush with the apertures 42 and do not extend beyond the inboard face 40 of the activator plate 38. The catching ends 78 of the struts 72 slide along the inboard face 40 of the activator plate 38, in both rotational directions.

Figure 5:
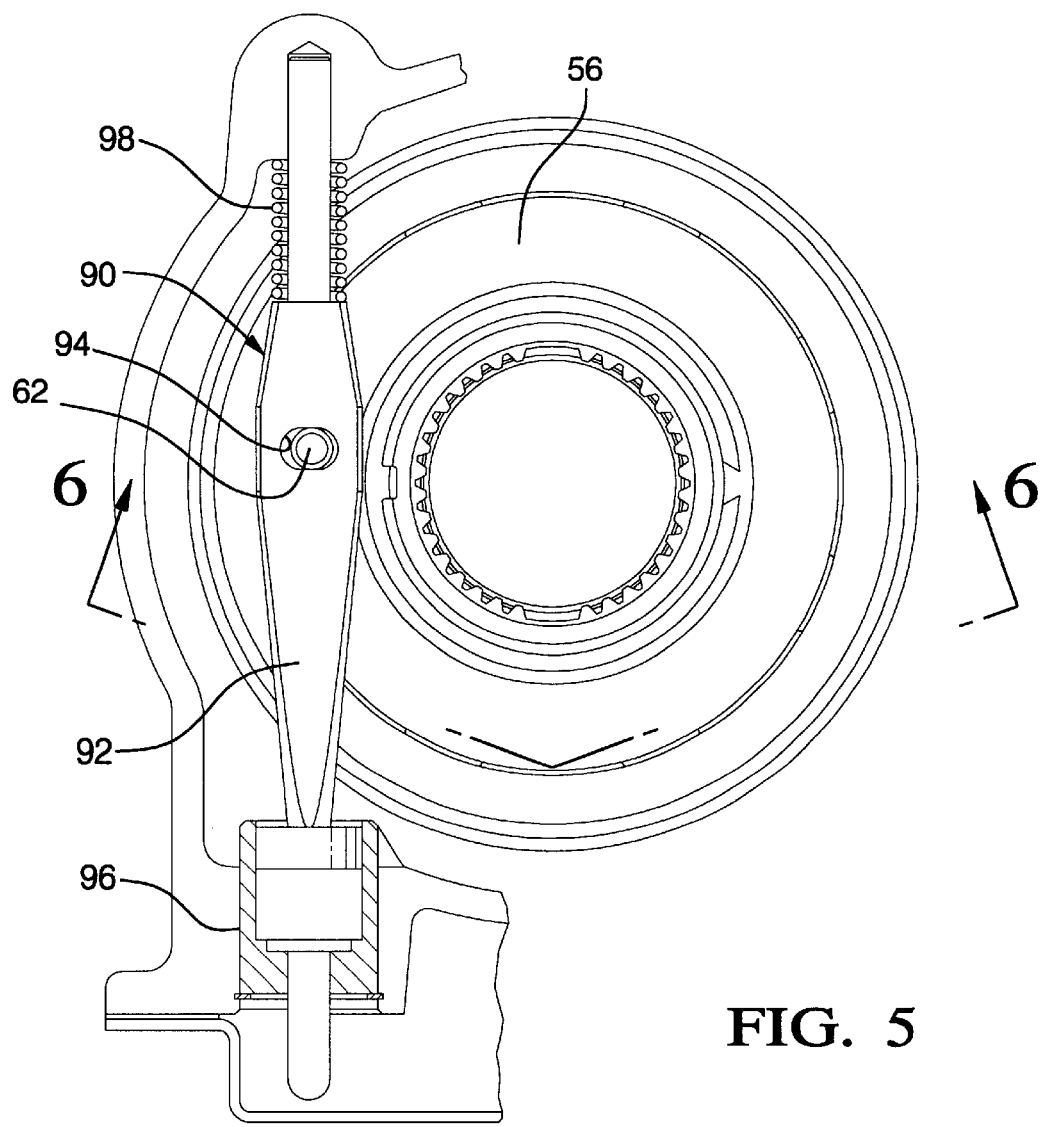
FIGS. 5 and 6 illustrate the clutch assembly in the clutch mode.
Figure 6:
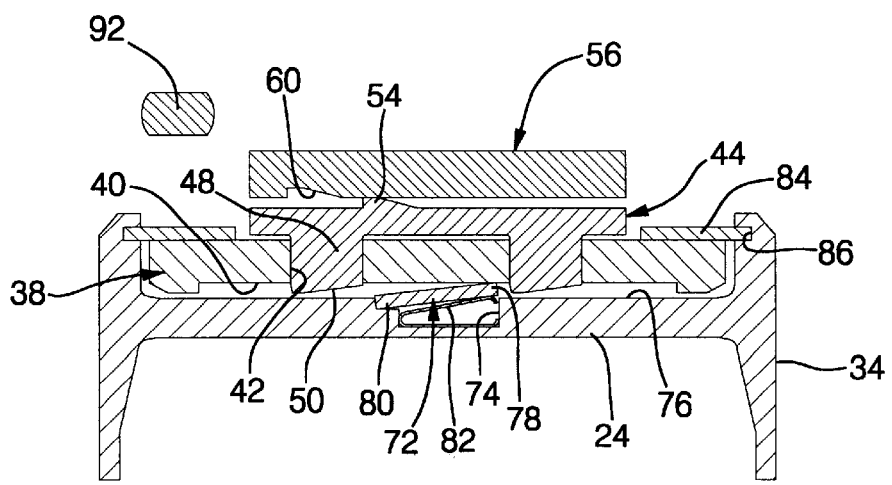

When one-way clutching is desired between the strut plate assembly 20 and actuator plate assembly 22, the control plate 56 is turned relative to the selecting plate 44 via the turning means 90. Here, as shown in FIGS. 5 and 6, the turning means 90 involves pressurizing the chamber 96 to displace the actuating member 92 and compress the spring 98. This turns the pin 62, thereby rotating the control plate 56 to which it is affixed. This rotation of the control plate 56 relative to the selecting plate 44 de-meshes the cams 54,60 and because of this cam action, the selecting plate is displaced axially inboard, towards the strut plate assembly 20, by compressing the return spring 68. The teeth 48 of the selecting plate 44 are therefore displaced to extend beyond the inboard face 40 of the activator plate 38. As shown in FIG. 6, the catching end 78 of the struts 72 engage the teeth 48 when rotated in the clutching direction, to the right in FIG. 6. This holds the strut plate assembly 20 from rotation in this clutching direction relative to the fixed activator plate 38.

Even when the clutching mode is selected, overrunning by the strut plate assembly 20 is still permitted in the counter-rotating, overrun direction, to the left in FIG. 6. The ramped ends 50 of the teeth 48 tend to cam the catching ends 78 of the struts 72 into their pockets 74 so they do not engage the teeth, allowing the strut plate assembly 20 to rotate in the overrun direction relative to the activator plate assembly 22.

When the clutching mode is deselected, the chamber 96 is depressurized and the activating member 92 is simply pushed back by the actuator release spring 98. The selecting cams 54 re-engage the interior cams 60 by camming action and by the biasing force of the return spring 68. This causes the selecting plate 44 and its teeth 48 to be displaced outboard such that the struts 72 do not engage the teeth, which allows for free-wheeling of the strut plate assembly 20.

In this embodiment, the strut plate 24 in FIG. 1 is welded to the reaction sun gear 28 of the compound planetary gear set and is integrally formed with the drum 34 of a friction servo band. In other applications, the strut plate may be integrally formed with the hub of a friction clutch. In any case, there is an independent braking source such as a friction servo band, not shown, for grounding or fixing the strut plate assembly 20, independent of the clutch assembly.

The following is one possible control sequence for a four-speed automatic transmission using the clutch assembly 10 of the present invention and one independent braking source for the strut plate assembly 20.

During park, reverse, and neutral, the braking source is released and the clutch is not activated, which permits freewheeling of the strut plate assembly 20 about the central hub journal 16.

In all drive gears, the clutch is activated. In first gear, the braking source is also applied. Therefore, although the strut plate assembly 20 would be permitted to rotate in the overrun direction, it is fixed in both directions by the braking source. In second, third, and fourth gears, the torque through the torque-transmitting piece 28 is in the overrun rotational direction of the clutch, and therefore the strut plate assembly 20 freewheels in the overrun direction. In manual low gears, the clutch is activated and the braking source is applied, therefore the strut plate assembly 20 cannot rotate in either direction.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A selectable one-way clutch assembly for use in an automatic transmission, comprising:

a strut plate assembly comprising a sun gear rotatable about a central hub, a cylindrical drum co-axial with said sun gear, and a strut plate formed integrally with said cylindrical drum and extending radially inward from said drum and affixed to said sun gear such that said strut plate is at an outboard end of said strut plate assembly, said clutch assembly further comprising an activator plate assembly co-axial and outboard of said strut plate assembly comprising an activator hub about said central hub, an activator plate formed integrally with and extending radially outward from an inboard end of said activator hub, said activator plate is in close axial adjacency with said strut plate and includes apertures arranged circumferentially thereabouts and extend therethrough, an annular selecting plate concentrically located about said activator hub and having circumferentially-spaced teeth extending axially inboard and configured to fit in said apertures in said activator plate and teeth ends having a ramped, camming surface, said selecting plate having selecting cams extending axially from an outboard surface, said activator plate assembly further comprising an annular control plate concentrically located about said activator hub and having interior cams on an inboard face to receive and mesh with said selecting cams and a pin fixed to an outboard face and extending axially outboard therefrom, and a return spring disposed between said activator plate and said selecting plate to provide an outboard pre-load on said selecting plate and control plate such that said teeth are fully retracted within said apertures, said clutch assembly further comprising struts mounted for pivotable rotation in pockets arranged circumferentially about an outboard side of said strut plate wherein said struts having a catching end biased outboard to contact the inboard face of said activator plate, and a turning means selectively operable to activate one-way clutching mode by rotating said pin of said control plate to disengage said selecting cams and displacing said selecting plate and said teeth inboard beyond the inboard face of said activator plate wherein said struts catch said teeth when said strut plate assembly is rotated in a clutching direction, thereby fixing said strut plate to said activator plate and wherein said catching ends of said struts are cammed in said pockets by said ramped camming ends of said teeth when said strut plate assembly is rotated in the opposing, overrun direction, thereby allowing freewheeling of said strut plate in said overrun direction and said turning means operable to be deselected to inactivate said one-way clutching mode allowing freewheeling of said strut plate in either direction.

2. A selectable one-way clutch assembly, as defined in claim 1, wherein said turning means includes a hydraulic actuator having an actuating member with a radial slot through which said pin extends, a pressurizeable chamber where upon pressurization said actuating member is displaced, rotating said pin, and an actuator release spring to bias and return said actuating member towards said pressurizeable chamber.

3. A selectable one-way clutch assembly for use in an automatic transmission, comprising:

an annular strut plate rotatable about a central hub and having circumferentially spaced pockets and struts mounted therein for pivotable rotation having a catching end biased outboard, an activator plate assembly co-axial and outboard of said strut plate comprising an activator hub about said central hub, an activator plate formed integrally with and extending radially outward from an inboard end of said activator hub, said activator plate is in close axial adjacency with said strut plate such that said catching ends of said struts contact said activator plate and includes apertures arranged circumferentially thereabouts and extending therethrough, an annular selecting plate concentrically located about said activator hub and having circumferentially-spaced teeth extending axially inboard and configured to fit in said apertures in said activator plate and teeth ends having a ramped, camming surface, said selecting plate having selecting cams extending axially from an outboard surface, said activator plate assembly further comprising an annular control plate concentrically located about said activator hub and having interior cams on an inboard face to receive and mesh with said selecting cams and a pin fixed to an outboard face and extending axially outboard therefrom, and a return spring disposed between said activator plate and said selecting plate to provide an outboard pre-load on said selecting plate and control plate such that said teeth are fully retracted within said apertures, and a turning means selectively operable to activate one-way clutching mode by rotating said pin of said control plate to disengage said selecting cams and displacing said selecting plate and said teeth inboard beyond the inboard face of said activator plate wherein said struts catch said teeth when said strut plate is rotated in a clutching direction, thereby fixing said strut plate to said activator plate and wherein said catching ends of said struts are cammed in said pockets by said ramped camming ends of said teeth when said strut plate is rotated in the opposing, overrun direction, thereby allowing freewheeling of said strut plate in said overrun direction and said turning means operable to be deselected to inactivate said one-way clutching mode allowing freewheeling of said strut plate in either direction.

4. A selectable one-way clutch assembly, as defined in claim 3, wherein said turning means includes a hydraulic actuator having an actuating member with a radial slot through which said pin extends, a pressurizeable chamber where upon pressurization said actuating member is displaced, rotating said pin, and an actuator release spring to bias and return said actuating member towards said pressurizeable chamber.

* * * * *